United States Patent [19]
Cartabiano et al.

[11] Patent Number: 5,764,164
[45] Date of Patent: Jun. 9, 1998

[54] ERGONOMIC HAND-ATTACHABLE CONTROLLER

[75] Inventors: Michael C. Cartabiano, Hermosa Beach; Kenneth J. Curran, Thousan Oaks, both of Calif.; David J. Dick; Douglas R. Gibbs, both of Longmont, Colo.; Morgan H. Kirby, Arvada, Colo.; Richard L. May, Manhattan Beach, Calif.; William J. A. Storer, Loveland; Adam N. Ullman, Boulder, both of Colo.

[73] Assignee: Reality Quest Corp., Longmont, Colo.

[21] Appl. No.: 798,291

[22] Filed: Feb. 7, 1997

[51] Int. Cl.⁶ .................... H03K 17/94; H03M 11/00
[52] U.S. Cl. .................. 341/22; 341/20; 341/23; 400/100; 273/148 B; 463/37; 345/156; 364/708.1
[58] Field of Search .............. 400/100; 273/148 B; 463/37; 341/20, 22, 23; 345/156, 157, 158; 364/708.1, 709.01

[56] References Cited

U.S. PATENT DOCUMENTS

| | | |
|---|---|---|
| 1,335,272 | 3/1920 | Broughton . |
| 3,022,878 | 2/1962 | Seibel et al. . |
| 3,541,541 | 11/1970 | Engelbart . |
| 3,778,058 | 12/1973 | Rausch . |
| 4,302,138 | 11/1981 | Zarudiansky . |
| 4,414,537 | 11/1983 | Grimes . |
| 4,462,594 | 7/1984 | Bromley et al. . |
| 4,488,017 | 12/1984 | Lee . |
| 4,489,316 | 12/1984 | MacQuivey . |
| 4,491,325 | 1/1985 | Bersheim . |
| 4,514,817 | 4/1985 | Pepper et al. . |
| 4,519,097 | 5/1985 | Chappell, Jr. et al. . |
| 4,540,176 | 9/1985 | Baer . |
| 4,542,291 | 9/1985 | Zimmerman . |
| 4,552,360 | 11/1985 | Bromley et al. . |
| 4,558,704 | 12/1985 | Petrofsky . |
| 4,567,479 | 1/1986 | Boyd . |
| 4,586,387 | 5/1986 | Morgan et al. . |
| 4,607,159 | 8/1986 | Goodson et al. . |
| 4,613,139 | 9/1986 | Robinson, II . |
| 4,650,934 | 3/1987 | Burke ........................ 200/5 A |
| 4,660,033 | 4/1987 | Brandt . |
| 4,711,543 | 12/1987 | Blair et al. . |
| 4,712,101 | 12/1987 | Culver . |
| 4,715,235 | 12/1987 | Fukui et al. . |
| 4,721,308 | 1/1988 | Trimble . |
| 4,722,625 | 2/1988 | O'Brien . |

(List continued on next page.)

FOREIGN PATENT DOCUMENTS 1245782  11/1988  Canada .

OTHER PUBLICATIONS

Randy Pausch, Virtual Reality on Five Dollars a Day, Apr. 1991, pp. 1–7.
Fisher et al., Virtual Environment Display System, Oct. 1986, pp. 1–11.
Nakano et al., Hitachi's Robot Hand, pp. 18–20. No Date.
Carol Marsha Ginsberg, Human Body Motion as Input to an Animated Graphical Display, May 1983, pp. 1–88.
Jennifer A. Hall, The Human Interface In Three Dimensional Computer Art Space, Oct. 1985, pp. 1–68.

Primary Examiner—Jeffery Hofsass
Assistant Examiner—Timothy Edwards, Jr.
Attorney, Agent, or Firm—Dilworth & Barrese

[57] ABSTRACT

An ergonomic hand-attachable controller for providing command signals to control movement of at least one object responsive to hand movement. The ergonomic hand-attachable controller includes a base with a top surface configured to support a palm of a user's hand. A plurality of planar finger members may be provided which incorporate at least one finger pad which is operable to control movement of a remote object. At attachment member is provided to secure a hand of a user with the top surface of the controller. Electronics within the ergonomic hand-attachable controller convert movement of a user's hand and fingers to command signals for controlling the movement of a remote object.

8 Claims, 12 Drawing Sheets

U.S. PATENT DOCUMENTS

| | | |
|---|---|---|
| 4,738,417 | 4/1988 | Wenger . |
| 4,754,268 | 6/1988 | Mori . |
| 4,823,634 | 4/1989 | Culver . |
| 4,824,111 | 4/1989 | Hoye et al. . |
| 4,839,838 | 6/1989 | LaBiche et al. . |
| 4,849,732 | 7/1989 | Dolenc . |
| 4,862,165 | 8/1989 | Gart . |
| 4,897,649 | 1/1990 | Stucki . |
| 4,905,001 | 2/1990 | Penner . |
| 4,927,987 | 5/1990 | Kirchgessner . |
| 4,954,817 | 9/1990 | Levine . |
| 4,982,618 | 1/1991 | Culver . |
| 4,988,981 | 1/1991 | Zimmerman et al. . |
| 5,038,144 | 8/1991 | Kaye . |
| 5,046,739 | 9/1991 | Reichow . |
| 5,047,952 | 9/1991 | Kramer et al. . |
| 5,059,958 | 10/1991 | Jacobs et al. . |
| 5,068,645 | 11/1991 | Drumm . |
| 5,097,252 | 3/1992 | Harvill et al. . |
| 5,151,553 | 9/1992 | Suzuki et al. . |
| 5,175,534 | 12/1992 | Thatcher . |
| 5,184,319 | 2/1993 | Kramer . |
| 5,207,791 | 5/1993 | Scherbarth ............................ 273/148 B |
| 5,212,372 | 5/1993 | Quick et al. . |
| 5,228,356 | 7/1993 | Chuang . |
| 5,229,756 | 7/1993 | Kosugi et al. . |
| 5,244,066 | 9/1993 | Mackoway et al. . |
| 5,252,970 | 10/1993 | Baronowsky . |
| 5,283,555 | 2/1994 | Ward et al. . |
| 5,288,078 | 2/1994 | Capper et al. . |
| 5,296,871 | 3/1994 | Paley . |
| 5,298,919 | 3/1994 | Chang . |
| 5,323,174 | 6/1994 | Klapman et al. . |
| 5,329,276 | 7/1994 | Hirabayashi . |
| 5,349,881 | 9/1994 | Olorenshaw et al. . |
| 5,355,146 | 10/1994 | Chiu et al. . |
| 5,355,147 | 10/1994 | Lear . |
| 5,363,120 | 11/1994 | Drumm . |
| 5,379,663 | 1/1995 | Hara . |
| 5,384,460 | 1/1995 | Tseng . |
| 5,410,332 | 4/1995 | Barry et al. . |
| 5,423,554 | 6/1995 | Davis . |
| 5,440,326 | 8/1995 | Quinn . |
| 5,444,462 | 8/1995 | Wambach . |
| 5,453,759 | 9/1995 | Seebach . |
| 5,459,312 | 10/1995 | Gurner et al. . |
| 5,481,263 | 1/1996 | Choi . |
| 5,485,171 | 1/1996 | Copper et al. . |
| 5,486,112 | 1/1996 | Troudet et al. . |
| 5,488,362 | 1/1996 | Ullman et al. . |
| 5,489,922 | 2/1996 | Zloof . |
| 5,493,314 | 2/1996 | Rowe . |
| 5,503,040 | 4/1996 | Wright . |
| 5,512,919 | 4/1996 | Araki . |
| 5,526,022 | 6/1996 | Donahue et al. . |
| 5,555,894 | 9/1996 | Doyama et al. . |
| 5,558,329 | 9/1996 | Liu . |
| 5,563,628 | 10/1996 | Stroop . |
| 5,565,861 | 10/1996 | Mettler et al. . |
| 5,568,928 | 10/1996 | Munson et al. . |
| 5,571,020 | 11/1996 | Toudet . |
| 5,572,238 | 11/1996 | Krivacic . |
| 5,581,276 | 12/1996 | Cipolla et al. . |
| 5,583,478 | 12/1996 | Renzi . |

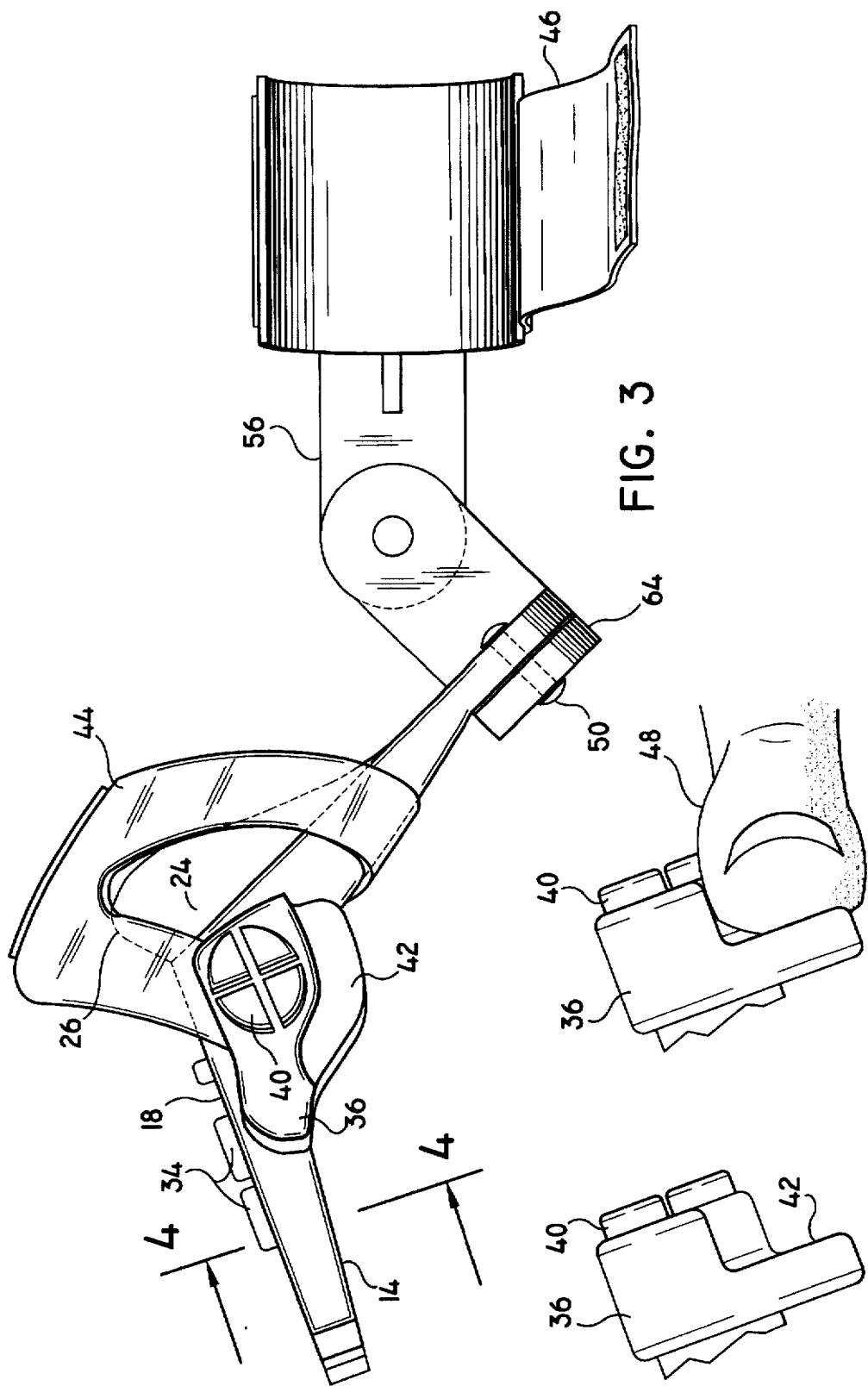

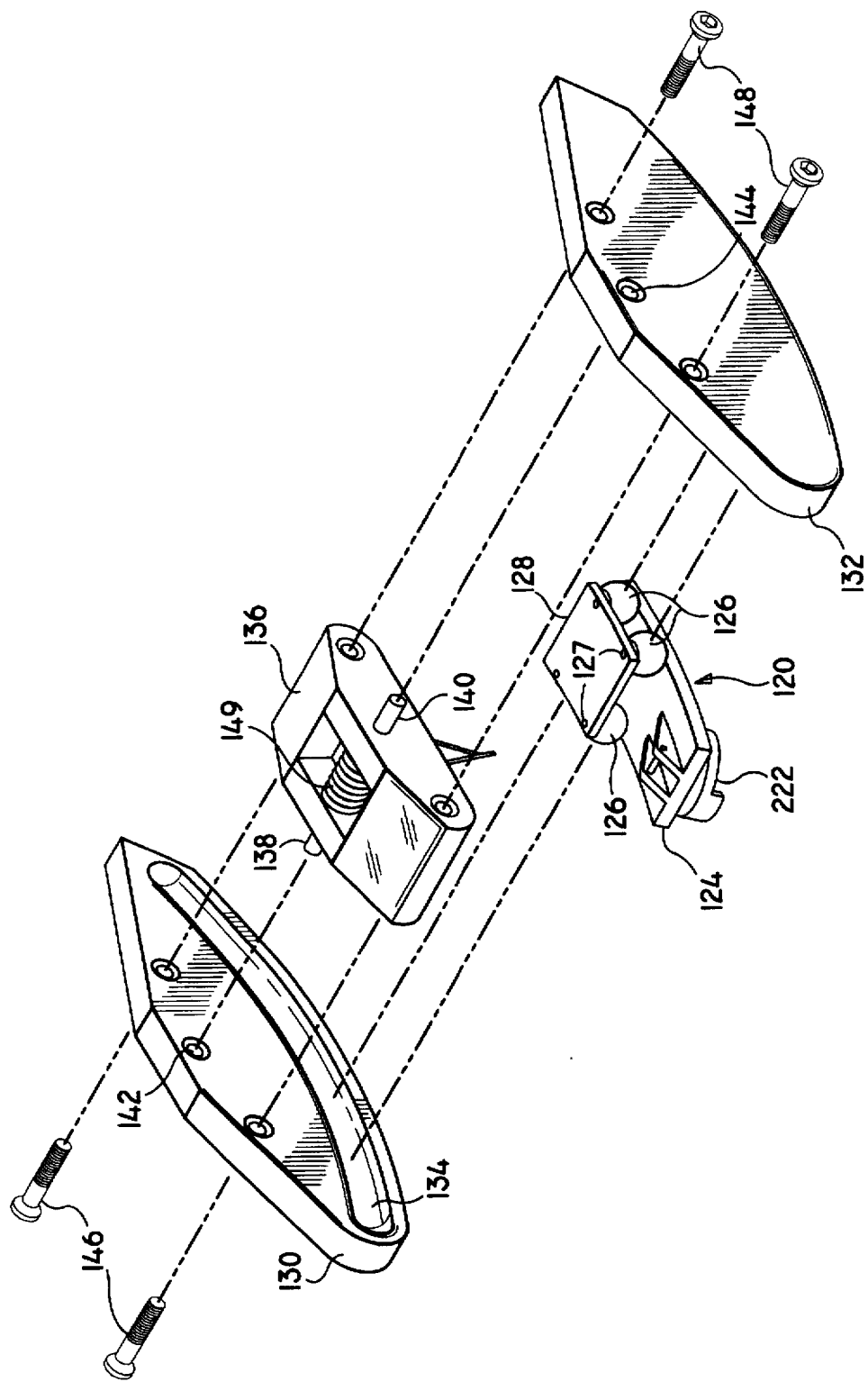

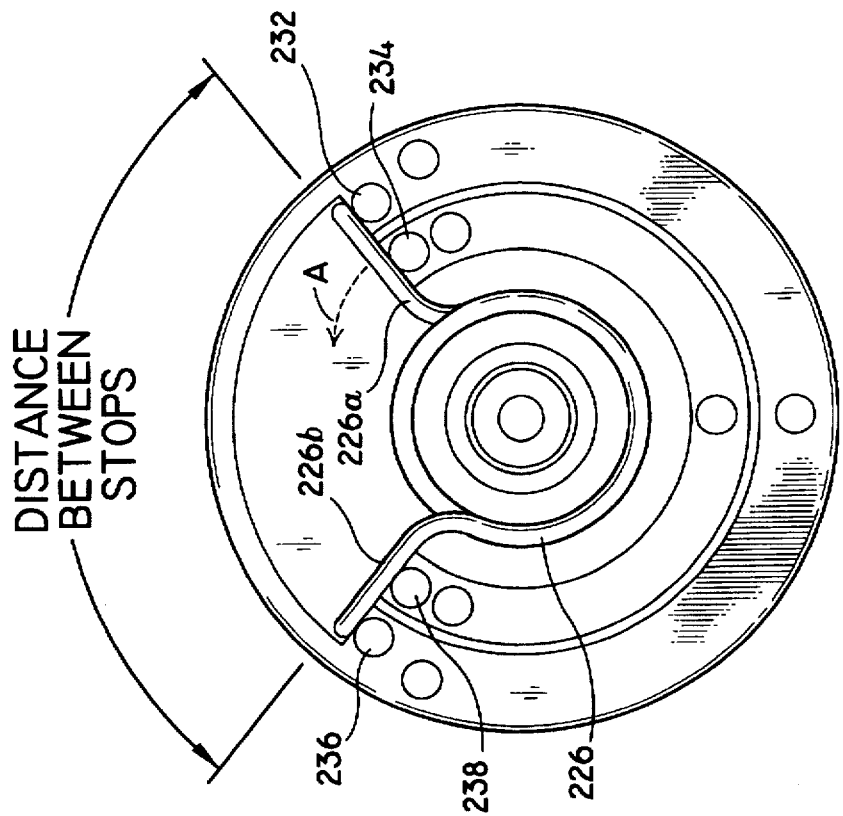
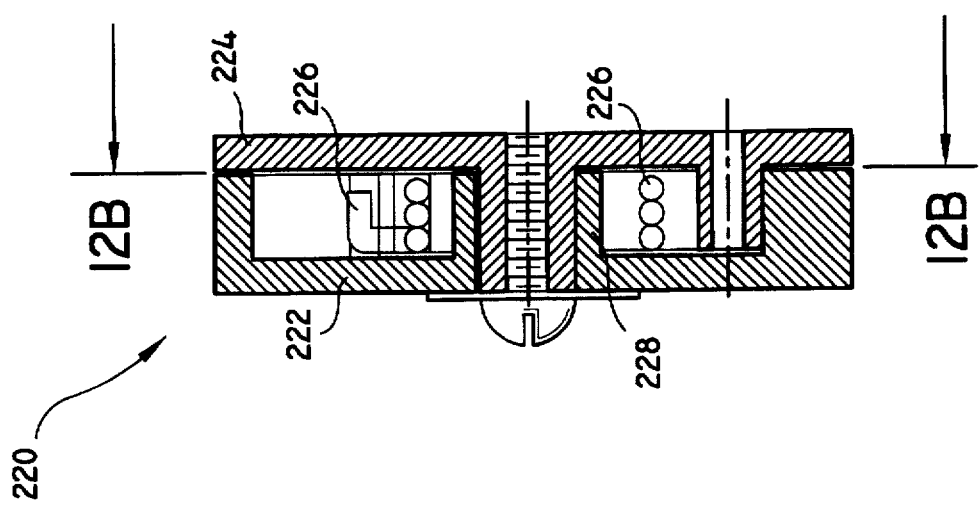

ERGONOMIC HAND-ATTACHABLE CONTROLLER

BACKGROUND OF THE INVENTION

1. Technical Field of the Invention

The present invention relates to ergonomic structural enhancements to a controller which is attachable to a hand of a user for commanding a movement of an object remote from the controller, such as movement of a video element or character on a video display.

2. Description of the Related Art

With the proliferation of computers and game stations that interface with a video monitor, interactive software programs that are operated on a computer or television screen have enjoyed increasing popularity in recent years. The conventional interface between the user and the game station is typically a joystick or game pad that has a number of control pads or buttons which, when depressed, result in specific movement or action of video characters on the display. For computer programs, the interface is typically the computer keypad or computer mouse. As such, one limitation of the conventional user interface is the lack of "virtual reality" capability to enable physical movement of a user to be translated to a corresponding movement of a video character.

One solution to this problem is proposed in U.S. Pat. No. 5,488,362 to Ullman et al., entitled APPARATUS FOR CONTROLLING A VIDEO GAME, and assigned to the assignee herein. The '362 patent discloses a hand attachment which has a number of detectors disposed at spaced apart locations of the hand attachment. Each detector detects a specific directional movement of a user's hand relative to the user's arm, such as left/right or up/down. The detected movement is converted to command signals which control the movement of at least one video element on a video display in directions corresponding to the hand movement. The hand attachment may also include a conductive contact on each finger and on the thumb. Bringing the thumb contact into contact with any of the other finger contacts results in a specific action of a video character such as firing a weapon or jumping.

Other virtual reality type hand attachments or gloves are also in the prior art. Each of these virtual reality type hand attachments disclose various means for converting movement of the hand into electrical signals to effect movement of a cursor or character on a video monitor.

However, the quality and complexity of video games have reached the point where users often use interactive programs for extensive periods of time. The combination of the time of use and the physical characteristics of the existing virtual reality type hand attachments creates muscle fatigue in the hands and arms of the user. None of the virtual reality type hand attachments or gloves in the prior art attempt to address this problem. Therefore, a need exists for an ergonomically designed virtual reality hand-attachable controller which will allow users to use interactive software programs for long periods of time without the accompanying muscle fatigue often encountered with the hand attachments of the prior art.

SUMMARY OF THE INVENTION

A principal objective of this invention is to provide a controller which is attachable to a hand of a user for commanding a movement of an object remote from the controller, such as movement of a video element or character on a video display, and which further features structure incorporating ergonomic enhancements to allow users to play video games or control other objects for long periods of time without experiencing muscle fatigue.

In a preferred embodiment of the present invention, an ergonomic hand-attachable controller includes a base with a top surface configured to support a palm of a user's hand. At least one finger pad is located on the top surface, operable to control movement of a remote object. Also, an attachment member is mounted adjacent the base for maintaining a hand of a user in engagement with the top surface In another embodiment of the present invention, an ergonomic hand-attachable controller comprises an upper portion which has a forward access face and a top surface for supporting a hand of a user. The upper portion is further defined by a grip on a side of the upper portion adjacent the forward access face. The grip acts as a rest for a user's pinkie, and further allows the pinkie to provide partial support of the hand-attachable controller. The ergonomic hand-attachable controller also comprises a housing fixedly connected to a side of the upper portion opposite the grip. A platform is preferably disposed on an outwardly facing side of the housing for engaging a thumb of a user. The ergonomic hand-attachable controller may further include an adjustable attachment member mounted on the upper portion to secure the user's hand thereon. A Y-shaped adjustable attachment member is preferred, and will secure the user's hand without limiting finger movement. An additional means for attaching the hand-attachable controller is provided to attach a wrist of a user.

In another embodiment, a centralized dome is included on the upper portion to enhance the support of a palm of a user. The centralized dome is defined by a transverse ridge which separates the arch from the forward access face. The forward access face may include a plurality of planar finger members. Each of the finger members and the housing connected to the side of the upper portion typically have apertures therein for receiving finger pads which may be depressed by fingers of a user to command movement of a cursor or character on a video monitor, or of other features of the device being controlled.

In yet another embodiment of the present invention, a means for accommodating a plurality of sizes of a hand of a user is provided. Pivot points are positioned to permit movement about these points which will in turn vary a position of the upper portion of the hand-attachable controller with respect to an arm of a user.

BRIEF DESCRIPTION OF THE DRAWINGS

For a better understanding of the invention, reference is made to the following description of exemplary embodiments thereof, considered with the accompanying drawings, wherein:

FIG. 3 is a side view of the ergonomic hand-attachable controller of FIG. 1;

FIG. 4 is a fragmentary side view of a housing and thumb platform;

FIG. 5 is a fragmentary side view of the housing and thumb platform of FIG. 4, showing the placement of a thumb thereon;

3

Figure 6:
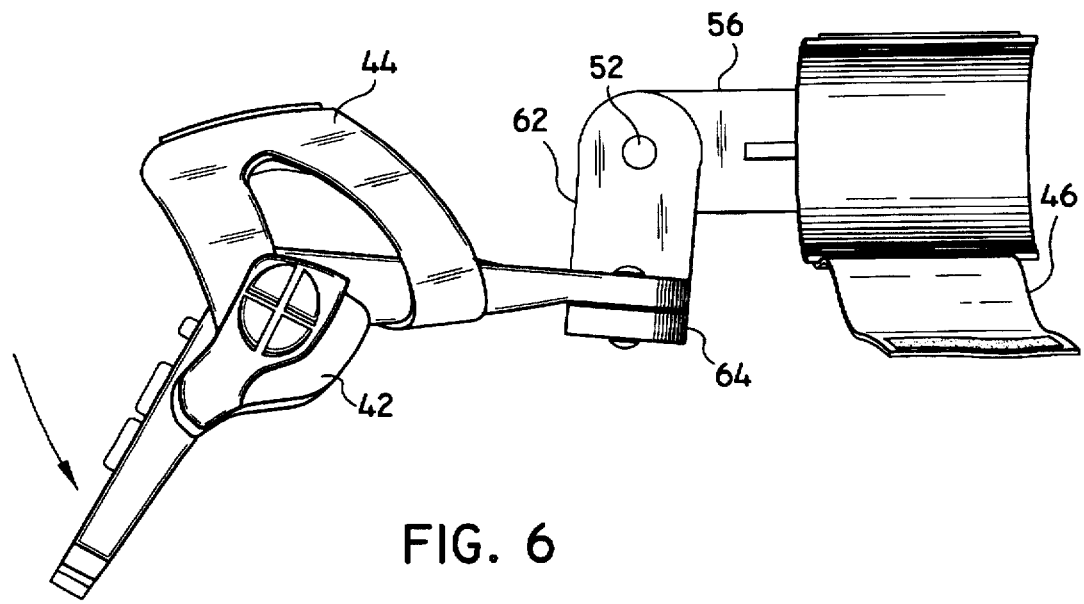
Figure 7:
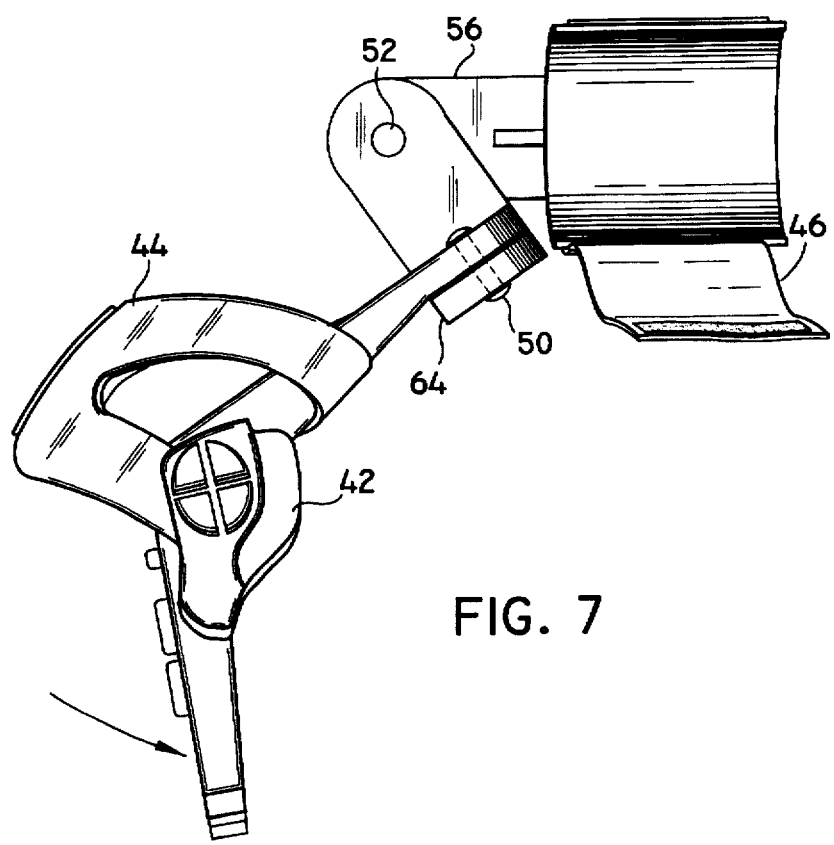
Figure 8:
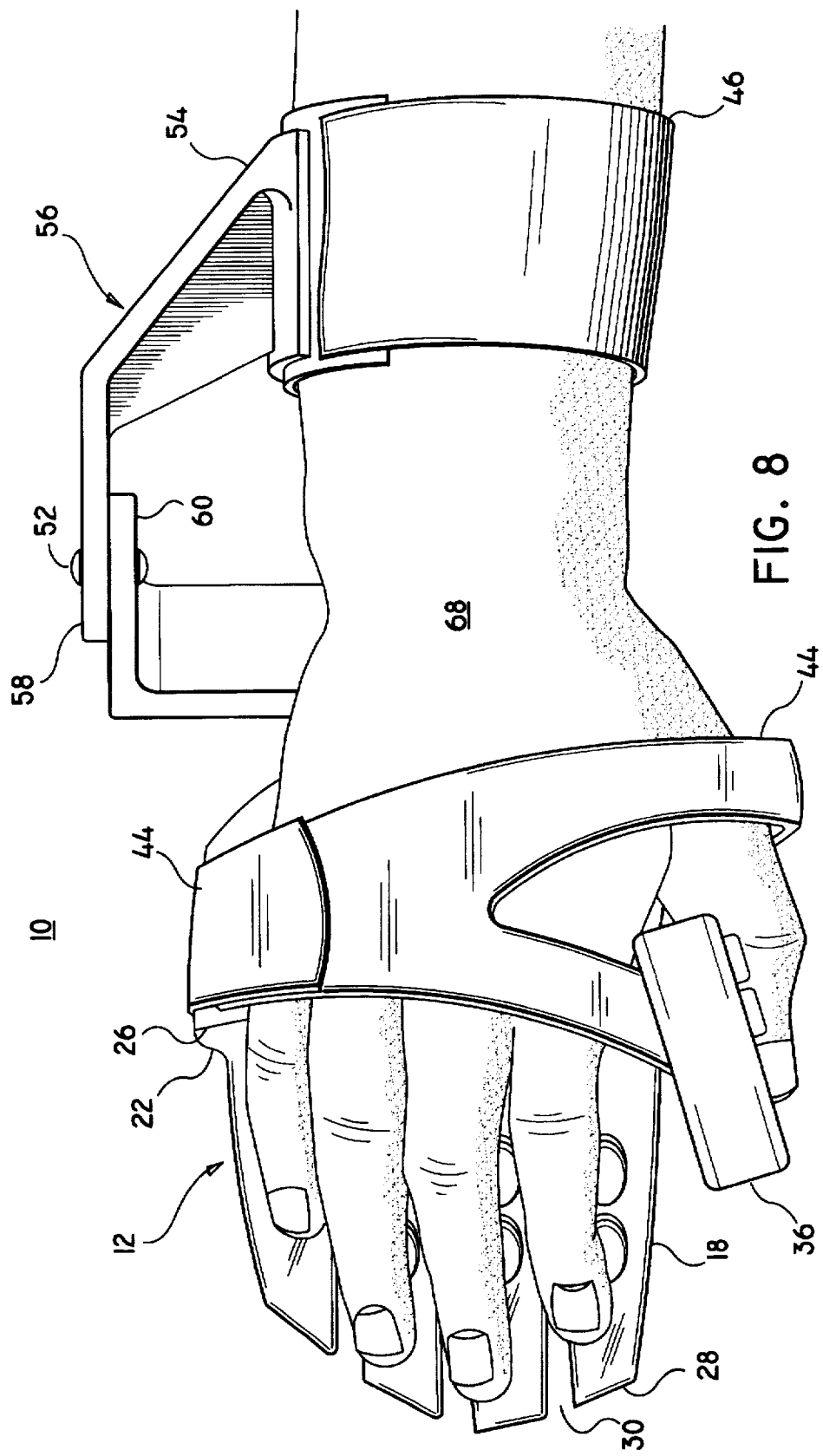
Figure 9:
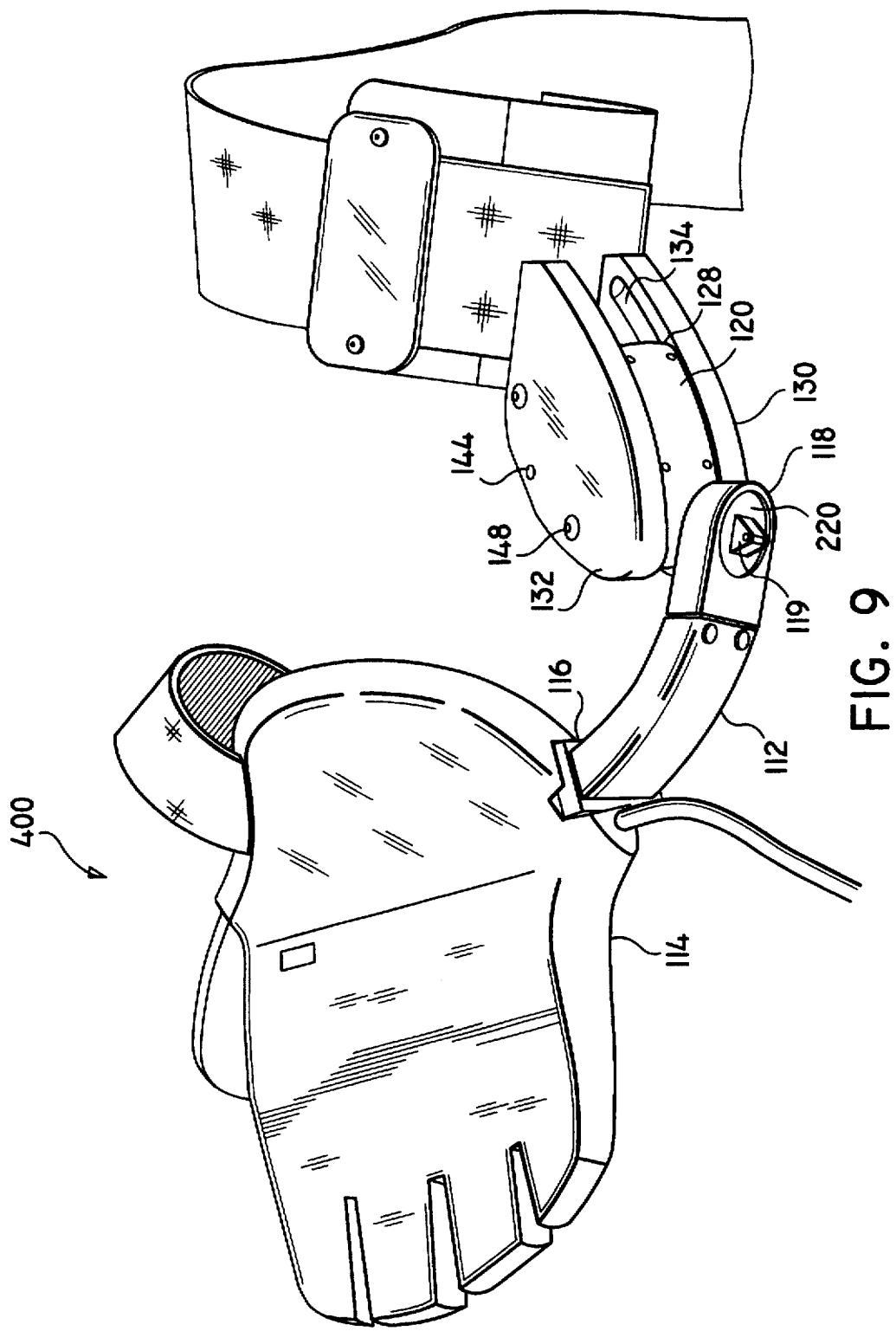
Figure 11C:
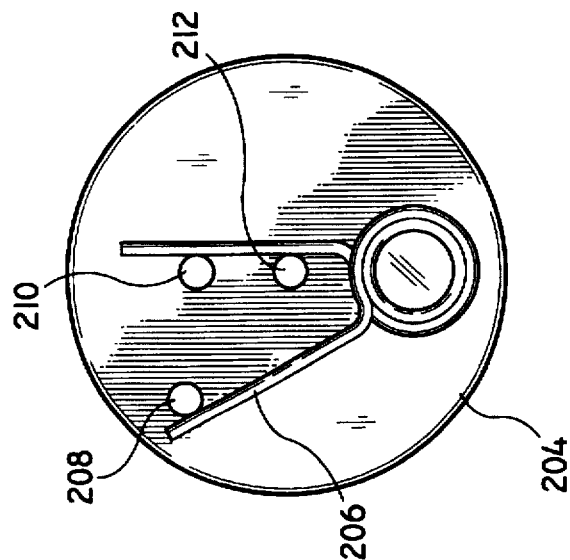
Figure 11B:
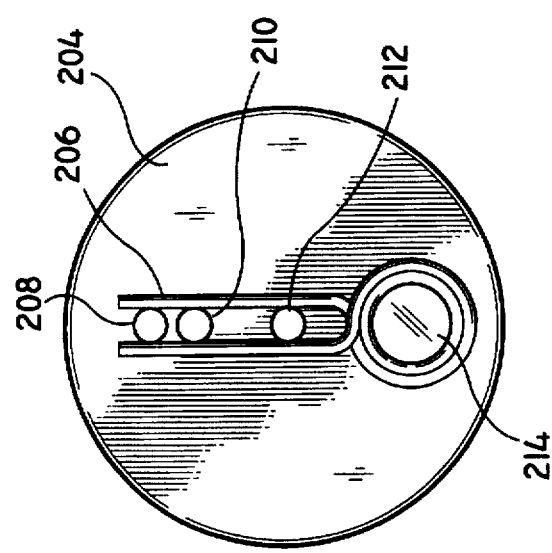
Figure 11A:
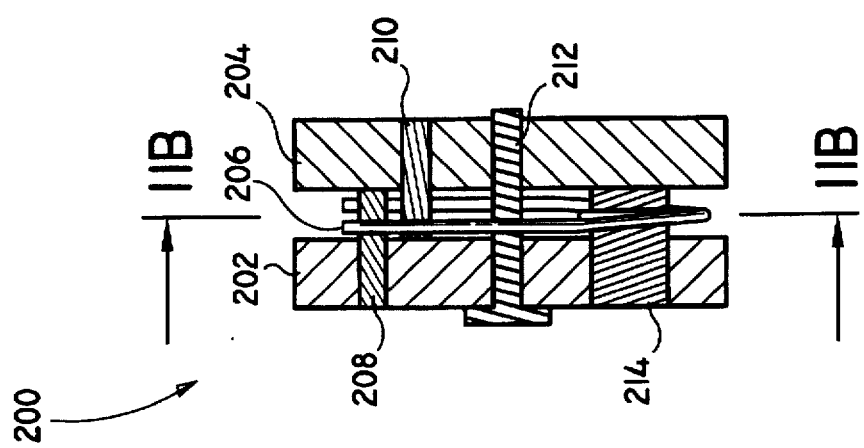
Figure 13:
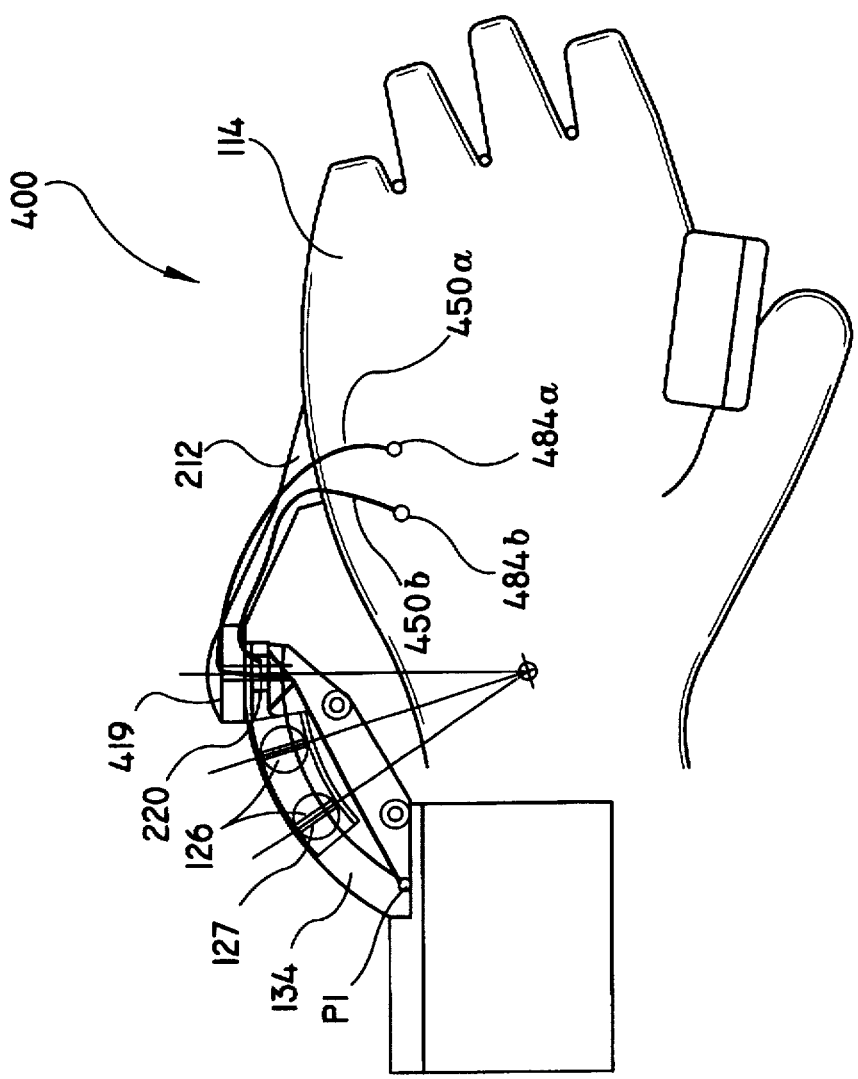
Figure 14:
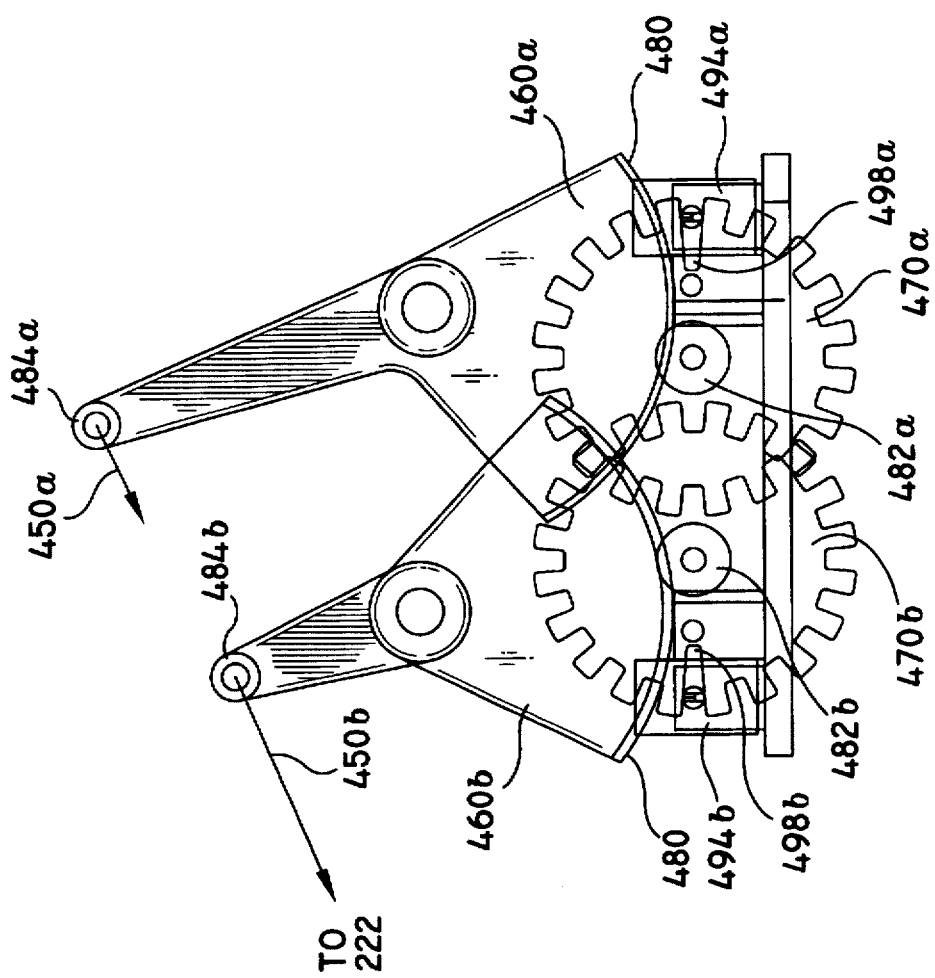
Figure 15:
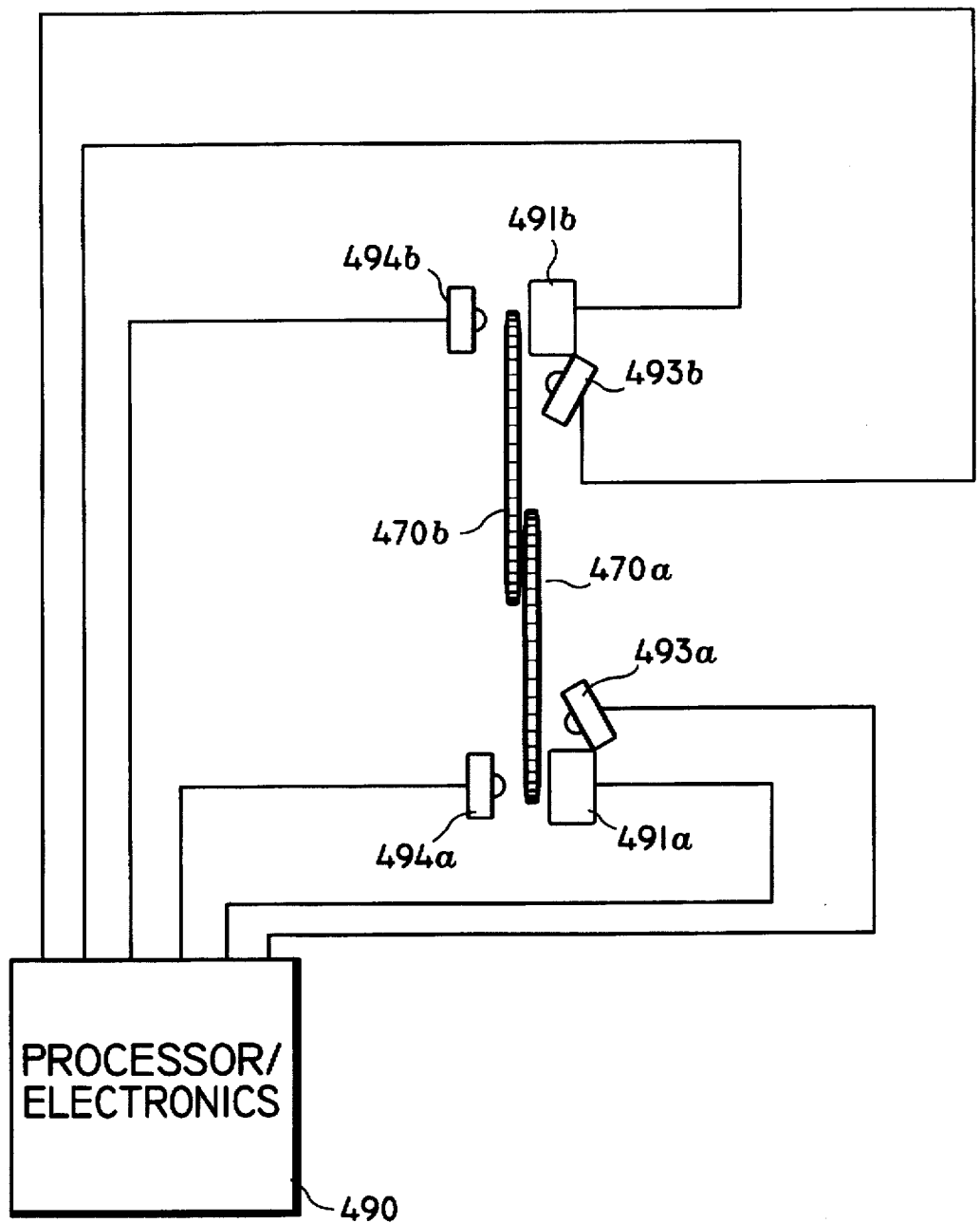

FIGS. 6 and 7 are side views of an ergonomic hand-attachable controller showing various pivot positions;

FIG. 8 is a top view of an ergonomic hand-attachable controller showing the placement of a hand and arm therein;

FIG. 9 is a perspective view of another embodiment of an ergonomic hand-attachable controller;

FIG. 10 is an exploded perspective view of an embodiment of an adjustment member;

FIG. 11A is an enlarged fragmentary cross-sectional side view of a resistive device which provides tactile feedback to the user;

FIG. 11B is an enlarged fragmentary cross-sectional top view of a resistive device taken along line 11B–11B of FIG. 11A;

FIG. 11C is an enlarged fragmentary cross-sectional top view of a resistive device of FIG. 11B with a deflected spring;

FIG. 12A is an enlarged fragmentary cross-sectional side view of another embodiment of a resistive device; and FIG. 12B is an enlarged fragmentary cross-sectional top view of another embodiment of a resistive device taken along line 12B—12B of FIG. 12A; and FIGS. 13–15 are views illustrating exemplary components and electronics within the controller of FIG. 9.

DETAILED DESCRIPTION OF THE DRAWINGS

A preferred embodiment of the present invention will be described below as an ergonomically improved hand-attachable controller for manipulating characters on video screens, such as in video games and the like. It is to be understood that the ergonomic structure enhancements disclosed and recited by the present invention may be applied to a variety of applications. Moreover, it is to be understood that the ergonomic hand-attachable controller of the present invention contains the means for converting movements of the hand or fingers into signals to control movement of at least one object such as a video element on a display, as is known to one ordinarily skilled in the art. For example, electronics within the housing of the hand-attachable controller convert the detected directional movement of the hand to command signals for controlling the movement of an object in directions corresponding to the hand movement.

Figure 1:
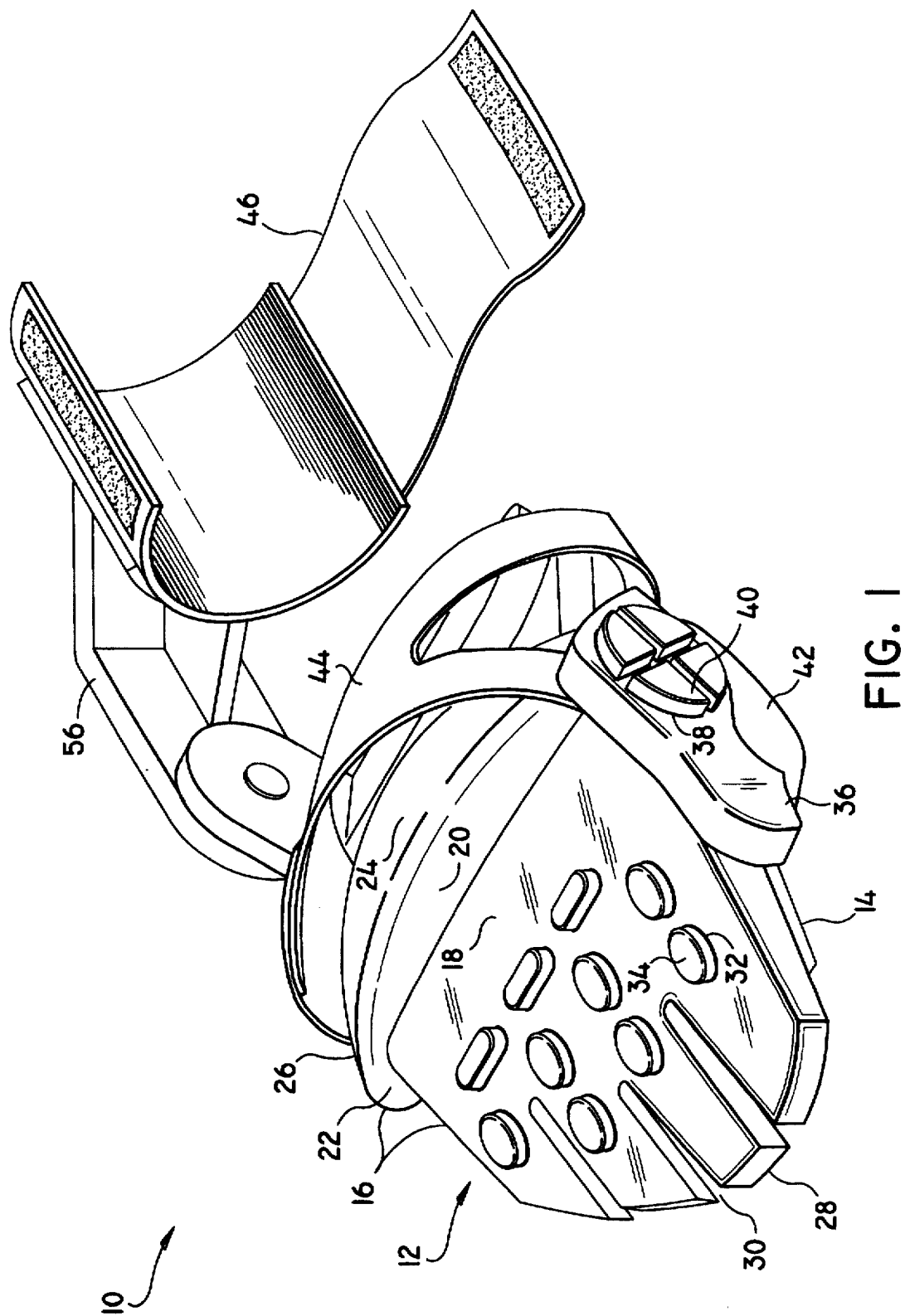
FIG. 1 is a perspective view of an ergonomic hand-attachable controller in accordance with one embodiment of the present invention.
Figure 2:
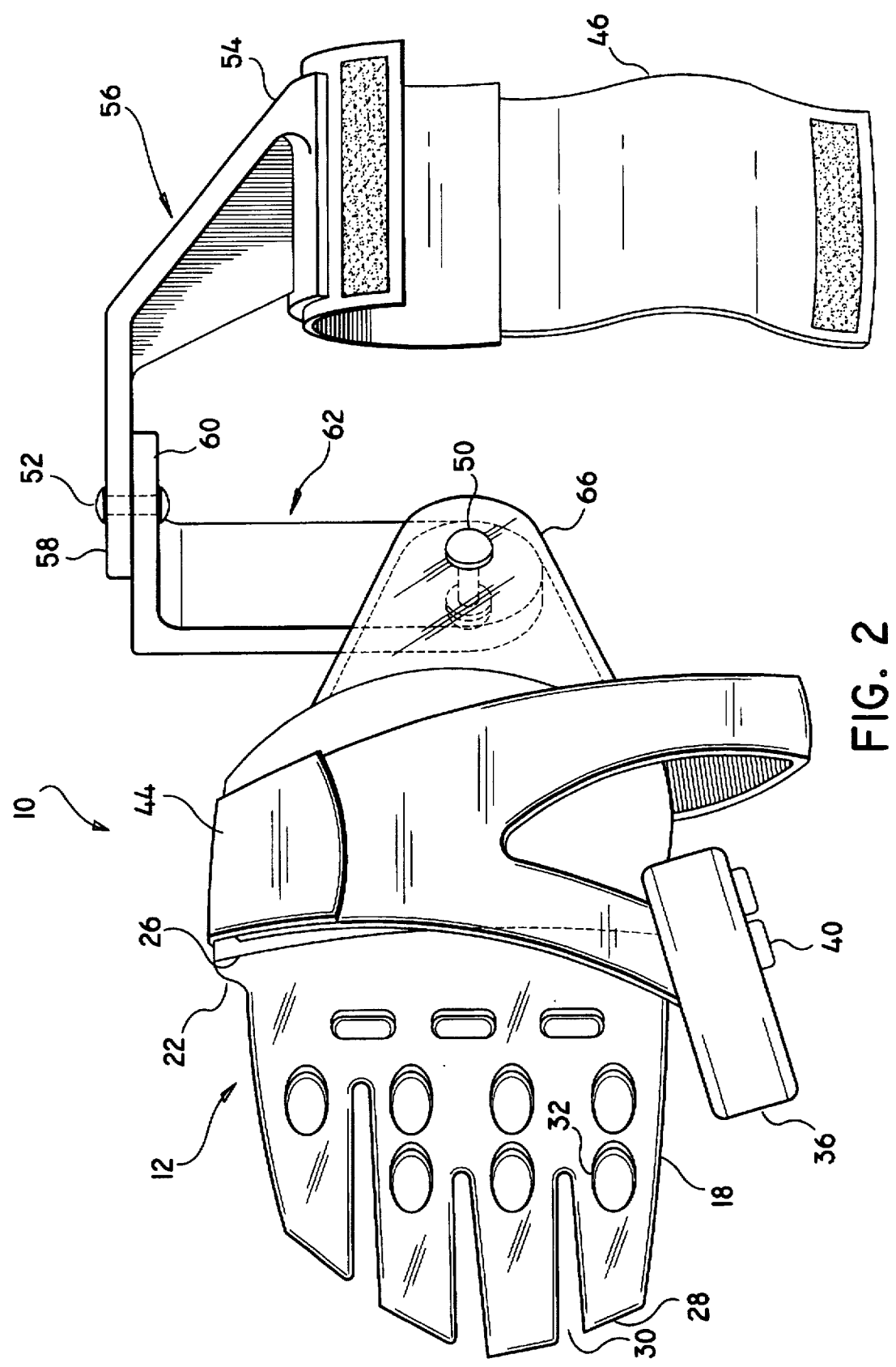
FIG. 2 is a top view of the ergonomic hand-attachable controller of FIG. 1.

Referring now to FIGS. 1 and 2, there is shown an ergonomic hand-attachable controller in accordance with one embodiment of the present invention. The ergonomic hand-attachable controller 10 comprises a first housing 12 having a base 14 and an upper portion 16. The upper portion 16 has a forward access face 18 and a top surface 20 for supporting a hand of a user. Top surface 20 includes a centralized arch 24 to enhance support of a user's palm. A ridge 26 extending transversely on upper portion 16 defines a distal end of centralized arch 24 and a proximal end of forward access face 18. Forward access face 18 is defined by four planar finger members 28 outwardly extending therefrom. The four planar finger members 28 have at least one aperture 32 therein for receiving an associated finger pad 34. In a preferred embodiment, the at least one aperture 32 and the associated finger pad 34 are elliptical. Elliptical finger pads provide enhanced access by the user's fingers and further allow more than one finger pad to be depressed simultaneously by one finger. Finger pads 34 are electrically connected to circuitry within the hollow interior of housing 12 to command control of a remote object such as an icon on a video display. Such circuitry may include a pair of optical encoder wheels with LEDs and photodetectors for

4 sensing wrist movement in orthogonal planes, with a microprocessor or field programmable gate array (FPGA) coupled to the LEDs/photodetectors. The microprocessor (or FPGA, etc.) forwards commands to an external game controller such as the SONY Playstation™, or to a computer or the like to command corresponding movement of a video icon. Suitable sensing and processing circuitry for use within hand-attachment 10 to implement the above functions is disclosed in copending U.S. patent application, Ser. No. 08/797,588, entitled HAND-ATTACHABLE CONTROLLER WITH DIRECTION SENSING, filed Feb. 7, 1997, Express Mail No. EM338584738US, assigned to the assignee herein and incorporated herein by reference.

A grip 22 is formed on a first side of the upper portion 16 adjacent the forward access face 18. In a preferred embodiment, grip 22 is contoured to the shape of a user's pinkie for a comfortable engagement thereof. Grip 22 also allows the user to partially support the ergonomic hand-attachable controller with the pinkie. The additional support allows the hand-attachable controller to be held firmly against the user's hand, counteracting the natural tendency for the controller to move in the direction that finger pads are being pressed. The additional support will also reduce a bouncing motion associated with depression of the finger pads. In a preferred embodiment, an irregular surface texture is provided on the grip 22 to enhance the engageability of the pinkie.

A second housing 36 is fixedly connected to first housing 12 on a side opposite the first side of upper portion 16. Second housing 36 has at least one aperture 38 for receiving an associated finger pad 40. In a preferred embodiment, second housing 36 has four apertures 38 and four finger pads 40, wherein the four apertures 38 and associated finger pads 40 are wedge-shaped and configured such that the pointed ends of the wedges are all directed to one central point. Finger pads 40 are typically depressed by a thumb of a user to correspondingly cause movement of an object remote from the controller. A platform 42 is disposed on an outwardly facing side of second housing 36 for engaging a user's thumb. In a preferred embodiment, platform 42 is contoured to the shape of a user's thumb for a comfortable engagement thereof. Also, an irregular surface texture is preferably provided on platform 42 to enhance the engageability of the thumb. Platform, 42 provides additional support of a user's hand when engaged by the thumb. Consistent with the additional support offered by the grip 22, as discussed supra, platform 42 provides additional support for the hand-attachable controller 10 when the plurality of finger pads 34 are depressed during use.

An adjustable attachment member 44 is affixed at either end to first housing 12 for securing a hand of a user to upper portion 16. In a preferred embodiment, adjustable attachment member 44 is Y-shaped with the forked end of the Y-shape affixed to the first housing 12 in a location to straddle a user's thumb. The user's thumb extends through the forked portion of adjustable attachment member 44 toward the second housing 36 to access finger pads 40 and platform 42. The straight end of the Y-shaped adjustable attachment member 44 is attached to first housing 12 adjacent grip 22. The preferred Y-shaped embodiment will permit hand-attachable controller 10 to be securely held, thereby preventing hand-attachable controller 10 from moving forwards or backwards with respect to the user's hand. Also, finger movement is not limited or restricted. More specifically, the Y-shape provides more uniform support and flexibility around the front and back of the thumb without restricting its movement. Adjustable attachment member 44 may comprise a self tightening substantially adjustable material, such as elastic, neoprene or rubber. A D-ring (not shown) may also be used to insertably receive an end of adjustable attachment member 44. The user would then have the ability to manually adjust the attachment member 44. Fastening may be accomplished by velcro, hooks or any other fastening method known to one ordinarily skilled in the art.

A means for attaching ergonomic hand-attachable controller 10 to a user's wrist is provided at the proximal end of the ergonomic hand-attachable controller 10. In a preferred embodiment, a strap 46 having velcro for adjustably attaching ergonomic hand-attachable controller 10 to a user's wrist is provided. Other embodiments for adjustably attaching hand-attachable controller 10 to a user's wrist may include a belt or elastic as is known to one ordinarily skilled in the art.

Referring now to FIG. 3, a side view of an ergonomic hand-attachable controller 10 is presented. As shown, platform 42 and the lower portion of second housing 36 are contoured to the shape of a thumb. Finger pads 40 are shown in a preferred wedge shape with the pointed end of the wedges all directed to a central point. Also shown is a side view of centralized arch 24 and ridge 26. A preferred attachment location of Y-shaped adjustable attachment member 44 is shown. The attachment location permits unobstructed access to platform 42 and finger pads 40 by a user's thumb.

FIGS. 4 and 5 are fragmentary side views of second housing 36 having platform 42 and finger pads 40. Referring to FIG. 5, there is shown the placement of a thumb 48 on platform 42. Thumb 48 provides support for the controller in its displayed position and is free to move upwardly to engage finger pads 40.

FIGS. 6 and 7, in conjunction with FIGS. 2 and 3, illustrate a means for pivoting hand-attachable controller 10 about at least one pivot point to accommodate a plurality of sizes of a hand of a user. Two pins 50 and 52 are employed to achieve the flexibility and rotatability similarly associated with the concept of a universal joint. The application of the universal joint concept to the present invention is advantageous in that it forms the basis for correlating two distinct position sensing systems within one mechanism while also providing a means for accommodating a plurality of hand sizes of a user. Referring to FIG. 2, a first end 54 of frame member 56 is fixedly connected to strap 46. A second end 58, of frame member 56 having a hole therein for insertably receiving pin 52 is rotatably connected to a first end 60 of frame member 62. First end 60 of frame member 62 also has a hole therein for insertably receiving pin 52. A second end 64 of frame member 62 has a hole therein for insertably receiving pin 50. Second end 66 of first housing 12 at an end opposite the four planar finger members 28 has a hole therein for insertably receiving pin 50. Referring specifically to FIGS. 6 and 7, an ergonomic hand-attachable controller 10 is shown in two positions pivoted about pin 52. Preferred embodiments as alternatives to the pin-configuration include the resistive devices as shown in FIGS. 9-12.

Referring now to FIG. 8, there is shown an ergonomic hand-attachable controller 10 attached to a hand 68 of a user. The palm of the hand is positioned on the centralized arch 24. Adjustable attachment member 44 is shown securing the hand to first housing 12.

Referring now to FIGS. 9 and 10, there is shown a preferred embodiment of a means for pivoting an ergonomic hand-attachable controller 400 about a wrist of a user. The means for pivoting controller 400 about a wrist of a use is ergonomically provided to engage a plurality of sizes of a hand of a user. An arm 112 extends outwardly from first housing 114. Arm 112 is fixedly attached at a proximal end 116 to first housing 114. A distal end 118 of arm 112 is rotatably engaged with housing 120. Housing 120 comprises a resistive device 220 on a first end 124 rotatably engaged with the distal end 118 of arm 112. (Only a portion 222 of resistive device 220 is shown in FIG. 10). A detailed description of preferred embodiments for resistive device 220 is given infra with reference to FIGS. 11A–C and 12A and B. Roller elements 126 are mounted on sides of housing 120 adjacent a second end 128 thereof. Axial posts 127 extend through the roller elements 126. Housing 120 is slidably engaged between side plates 130 and 132. Side plates 130 and 132 have an arch-shaped groove 134 therein for slidable engagement with roller elements 126. A frame member 136 is positioned between side plates 130 and 132 in juxtaposition with housing 120. Spring 149 operates as a resistive device in a plane orthogonal to the plane that resistive device 220 provides resistance. As such, the user's wrist is spring biased to a center position in two orthogonal planes. Pins 138 and 140 are mounted in frame member 136 and extend perpendicularly therefrom. Side plates 130 and 132 have holes 142 and 144 therein for insertably receiving pin 138 and 140. Fasteners 146 and 148 are provided to attach side plates 130 and 132 to frame member 136.

As noted above, hand-attachable controller 10 may also include a resistive device which urges the user's wrist to return to a neutral position and provides feedback to the use when he/she is out of a neutral position. The resistance may or may not be variable, depending on the extent to which the user is out of center.

Referring now to FIGS. 11A–11C, a first embodiment of such a resistive device is illustrated, designated generally as 200. Device 200 includes a torsion spring 206 between a first plate 202 and a second plate 204. Two resistive devices 200 are integrated with hand attachment 10, one mounted at a location corresponding to the top or bottom of the user's wrist and the other to correspond to side of the wrist. The device 200 at the top or bottom of the wrist urgingly biases the wrist to a centralized horizontal position, whereas the side mounted device 200 urgingly biases the wrist to a centralized vertical position. As shown in FIGS. 11A and 11B, pins 208 and 210 are pressed within plates 202 and 204, respectively. These pins are interposed between the legs of spring 206. Pin 212 holds the plates together by means of a press fit into plate 204 and a rotatable fit through the hole on the center of plate 202. Pin 212 may be used to mount device 200 to hand-attachable controller 10. Pin 214 acts as an anchor for spring 206. As plates 202 and 204 are rotated with respect to one another by virtue of wrist movement, pins 208 and 210 force the deflection of spring 206. The force depends on the spring constant of spring 206. Once the spring 206 is deflected, the user must maintain sufficient force deflecting the spring to avoid returning to the neutral position as a result of the spring's counter-force. Deflection of spring 206 is illustrated in FIG. 11C. It is noted that pins 208 and 210 may be molded into plates 202 and 204 rather than being separate pieces if the spring force is sufficiently light or if plastics of sufficient strength are used in the construction of the unit.

FIGS. 12A and 12B show cross-sectional side and top views of another resistive device 220, which is an alternative to the resistive device 200 discussed above. Device 220 includes a first plate 222 that rotates with respect to a second plate 224 as the user's wrist moves. A spring 226 wraps as a coil around a collar 228 within a cut-out of plate 222. Spring 226 performs the analogous function of spring 206, which is to bias the user's wrist towards a neutral position. However, being concentrically located, the effective length of spring 226 can be larger, thereby furnishing a lower spring constant than the design of spring 206. Pins 232–238 serve as bearing surfaces for spring 226. Two devices 220 may be mounted to hand-attachable controller 10, to permit a neutral position bias in two orthogonal planes.

In operation, wrist motion of the user causes plates 222 and 224 to rotate from their original positions, causing spring end 226a to move towards spring end 226b in direction A. Consequently, spring 226 is tensioned into a more stressed position, imparting a slight force to the user. Release of torque on the plates causes spring 226 to return the mechanism to the original, at rest, position. Since resistive device 220 employs a longer effective spring 226 than the spring 206 of device 200, the spring constant may be lowered while still providing a usable "feel" for the overall unit. Spring 226 also serves as a means for forming stops to limit the angle of movement of plates 222 and 224 with respect to one another. The distance between the stops corresponds to the arc between the spring ends 226a and 226b in the least untensioned position as depicted in FIG. 12B. The ends of spring 226 are formed to include a right angle therein. The right angle formed in the ends of spring 226 prevent the ends from receding into a slot formed between plates 222 and 224.

FIG. 13 shows a partial sectional view of controller 400, illustrating filaments 450a and 450b, each functioning to implement rotation of an associated optical encoder wheel within the interior of base 114. Filament 450a runs through the left/right pivot 119 and is anchored to a fixed point P1 within groove 134. The other end of filament 450a runs through side arm 112 into the interior of base 114 and attaches to an attachment point 484a. Movement of filament 450a causes rotation of an up/down optical encoder wheel within base 114. By running filament 450a through the left/right pivot 119, cross-talk with left/right movement is reduced or eliminated. In other words, left/right movement will produce zero or minimal rotation of the up/down encoder wheel. Filament 450b is associated with left/right movement and is attached on one end to a fixed point on resistive device 220. The other end of filament 450b is attached to attachment point 484b of a left/right sector gear within housing 114.

Referring to FIG. 14, filament 450a attaches to attachment point 484a of up/down sector gear 460a. Sector gear 460a is spring loaded. As such, varying tension of filament 450a, which is caused by vertical movement of the user's wrist (with controller 400 in the "handshake" position) rotates sector gear 460a. Teeth 480 of sector gear 460a engage teeth of pinion 482a affixed to encoder wheel 470a. Hence, rotation of sector gear 460a produces rotation of encoder wheel 470a. Likewise, filament 450b attaches to point 484b of sector gear 470b, and causes rotation of sector gear 460b when the user moves his/her wrist horizontally. Encoder wheel 470b thus rotates and corresponding electrical signals are transmitted to the processor.

Encoder wheel 470a may have an elongated slot 498a. As shown in FIG. 15, an LED 494a is disposed adjacent dual phototransistor package 491a in a quadrature encoding arrangement. Zeroing photodetector 493a receives sufficient light only when slot 498a is aligned between detector 493a and LED 494a. When detector 493a receives sufficient light, the counters of processor 490 (or FPGA, etc) are reset As such, a centering switch or additional LED to detect the center position can be optionally avoided. Encoder wheel 460b has an analogous slot 498b used in conjunction with LED 494b an detector 493b in an analogous manner.

Processor/electronics 490 may be similar or identical to the circuitry disclosed in copending U.S. patent application mentioned above, Ser. No. 08/797,588, entitled HAND-ATTACHABLE CONTROLLER WITH DIRECTION SENSING, assigned to the assignee herein.

It will be understood that various modifications can be made to the embodiments of the present invention disclosed herein without departing from the scope and spirit thereof. Therefore, the above description should not be construed as limiting, but merely as exemplifications of preferred embodiments thereof. Those skilled in the art will envision other modifications within the scope and spirit of the present invention as defined by the claims appended hereto.

What is claimed is:

1. An ergonomic hand-attachable controller comprising:
   a base having a top surface configured to support at least a portion of a palm of a user's hand;
   a first attachment member mounted adjacent said base for maintaining a hand of a user in engagement with said top surface;
   a means for pivoting said base in a plurality of axis about a wrist of a user;
   a second attachment member mounted adjacent said means for pivoting said base, for engaging an arm of a user; and,
   circuit means for generating command signals to control movement of a remote object in correspondence with wrist movement of the user.

2. An ergonomic hand-attachable controller as recited in claim 1, wherein said means for pivoting said base comprises at least one pinned rotatable joint.

3. An ergonomic hand-attachable controller as recited in claim 1, wherein said means for pivoting said base comprises a slidable adjustment member.

4. An ergonomic hand-attachable controller as recited in claim 1, wherein said second attachment member comprises an adjustable strap having velcro.

5. An ergonomic hand-attachable controller as recited in claim 1, wherein said means for pivoting said base comprises at least one rotatable resistive device.

6. An ergonomic hand-attachable controller as recited in claim 5, wherein said at least one rotatable resistive device includes a spring for urgingly biasing said top surface to a neutral position.

7. An ergonomic hand-attachable controller comprising:
   a base having a top surface configured to support at least a portion of a palm of a user's hand;
   at least one finger pad on a distal end of said top surface, said at least one finger pad being operable to control movement of a remote object;
   a first attachment member mounted adjacent said base for maintaining a hand of a user in engagement with said top surface;
   a means for pivoting said base in a plurality of axis about a wrist of a user;
   a second attachment member mounted adjacent said means for pivoting said base, for engaging an arm of a user; and
   a means for receiving at least one sensing device for detecting directional movement of a user's hand relative to a user's arm.

8. An ergonomic hand-attachable controller as recited in claim 7, wherein said at least one sensing device for detecting directional movement of a user's hand relative to a user's arm comprises at least one optical encoder.

* * * * *

UNITED STATES PATENT AND TRADEMARK OFFICE
CERTIFICATE OF CORRECTION

PATENT NO. : 5,764,164
DATED : June 9, 1998
INVENTOR(S) : Cartabiano, et al.

It is certified that error appears in the above-identified patent and that said Letters Patent is hereby corrected as shown below:

On the title page, item [75],
The inventor information should be amended to read as follows:

Michael C. Cartabiano, Hermosa Beach, California; Kenneth J. Curran, Thousand Oaks, California; David J. Dick, Longmont, Colorado; Douglas R. Gibbs, Longmont, Colorado; Morgan H. Kirby, Arvada, Colorado; Richard L. May, Manhattan Beach, California; William J.A. Storer, Loveland, Colorado; Adam N. Ullman, Boulder, Colorado; Noah T. Ullman, Boulder, Colorado; Sheldon M. Tuck, Erie, Colorado Signed and Sealed this Twelfth Day of January, 1999

Attest:

*Attesting Officer*  *Acting Commissioner of Patents and Trademarks*